Feb. 12, 1929.                                                       1,702,192
A. L. BLOMFIELD ET AL
PROCESS OF SEPARATING SOLIDS FROM LIQUIDS
Filed May 12, 1924          4 Sheets-Sheet 1

INVENTORS
A.L. Blomfield
L.S. Harner.
H.S. Coe

ATTORNEY.

INVENTOR.
A. L. Blomfield
L. S. Karner
H. S. Coe.
BY
ATTORNEY.

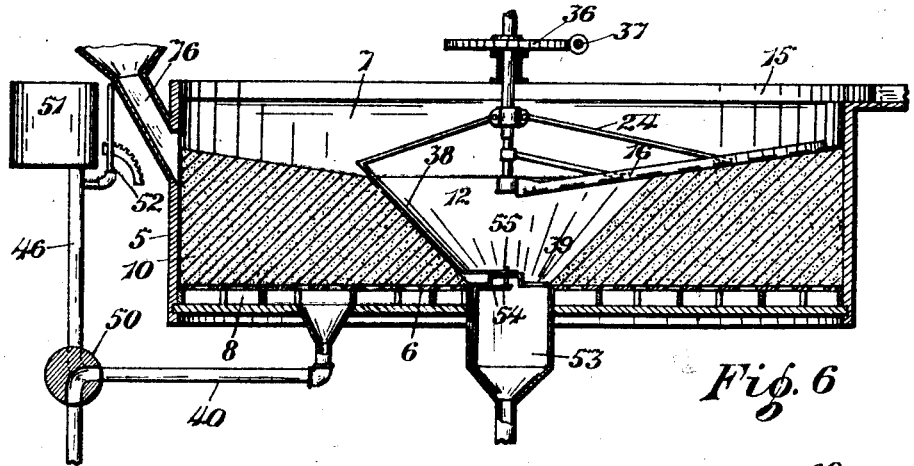
Fig. 6
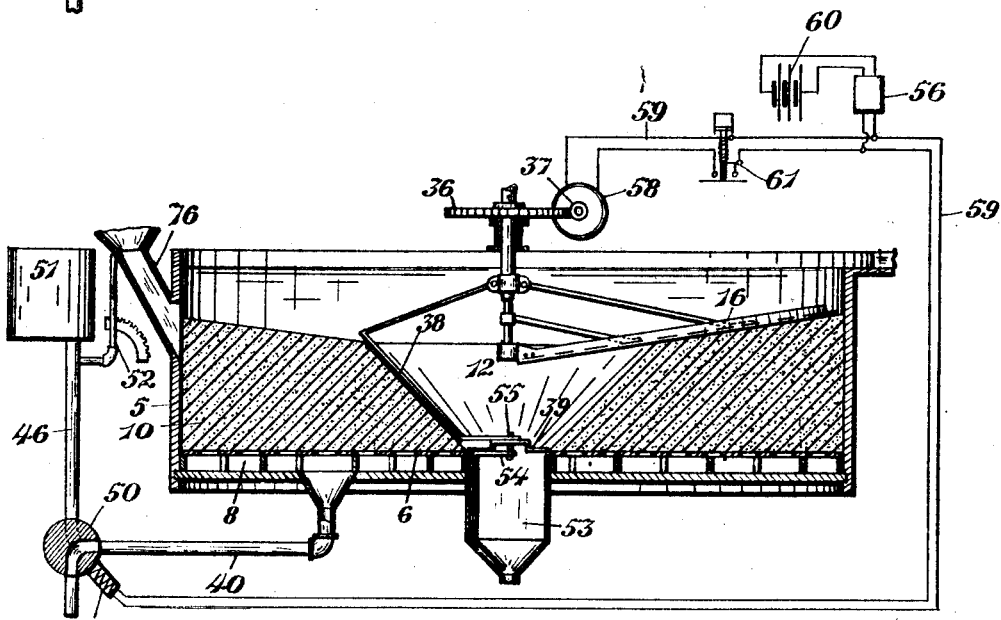
Fig. 7
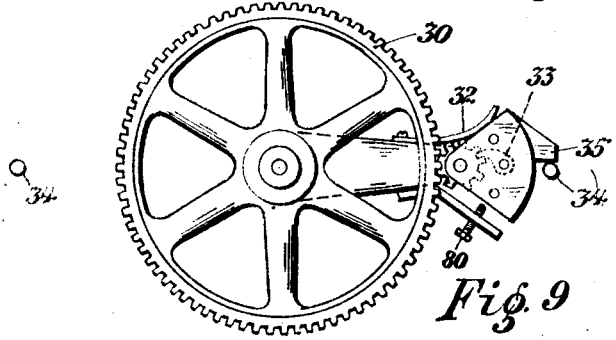
Fig. 9
INVENTORS
A. L. Blomfield
L. S. Harner
H. S. Coe
BY
ATTORNEY.

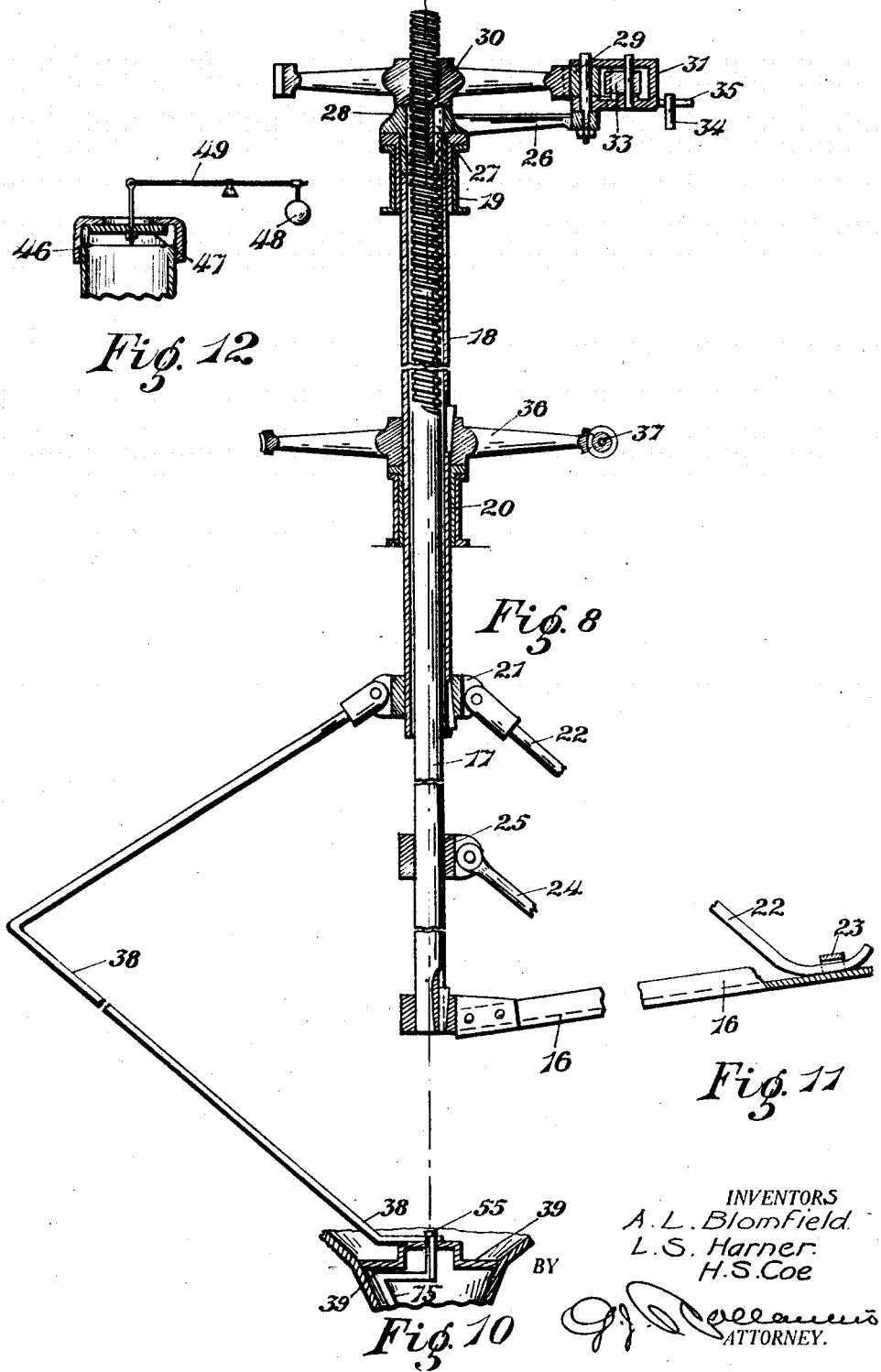

Patented Feb. 12, 1929.

1,702,192

UNITED STATES PATENT OFFICE.

ALFRED L. BLOMFIELD AND LOYAL S. HARNER, OF COLORADO SPRINGS, COLORADO, AND HARRISON S. COE, OF LAWRENCE, KANSAS, ASSIGNORS, BY MESNE ASSIGNMENTS, TO THE CYCLE COMPANY, OF COLORADO SPRINGS, COLORADO, A CORPORATION OF COLORADO.

PROCESS OF SEPARATING SOLIDS FROM LIQUIDS.

Application filed May 12, 1924. Serial No. 712,659.

This invention relates to a process of separating solids from liquids in the treatment of dirty waters of metallurgical and chemical processes, by what is commonly known in the art as "thickening" or "clarification" and the primary object of our invention is to provide an efficient and highly expeditious method of effecting a clean separation of solids from liquids in materials of the above stated character by subjecting them to a settling action above a filtering medium with a concurrent withdrawal of supernatant and subsurface liquids.

A further object of the invention is to combine with the actions above referred to, a simultaneous removal of separated solids, and another object is to maintain the filtering medium in a condition of maximum efficiency by the constant or periodic removal of its fouled upper strata with the settled and thickened solids.

The percolative action of the process is obviously dependent on the force under which the liquid passes through the filtering medium and it is another object of the invention to regulate said force according to known requirements by a manual or automatic control of the ratio of pressures above and below the settling surface.

Still further objects of the invention reside in the construction and arrangement of the operating parts of the mechanism employed to carry the process into practice, as will fully appear in the course of the following description.

In the accompanying drawings, several embodiments of the invention have been shown and corresponding parts of the apparatus depicted in the several views have been designated by similar characters of reference.

Figure 6 illustrates a modified method of regulating the ratio of pressures above and below the settling area;

Figure 7 illustrates the regulating means in an automatic system;

Figure 8 represents a sectional and fragmentary elevation of a mechanism for the operation of the device employed for the removal of settling solids;

Figure 9 is a plan view of the upper portion of the mechanism shown in Figure 8;

Figure 10 shows an enlarged sectional view of the bearing for the support of the well-forming and cleaning part of the mechanism;

Figure 11 is a fragmentary sectional view of the scraper element of the mechanism and the corresponding end of the driving member by which it is operated; and Figure 12 illustrates a modified method of regulating the ratio of pressures above and below the filter bed of the apparatus.

Figure 1:
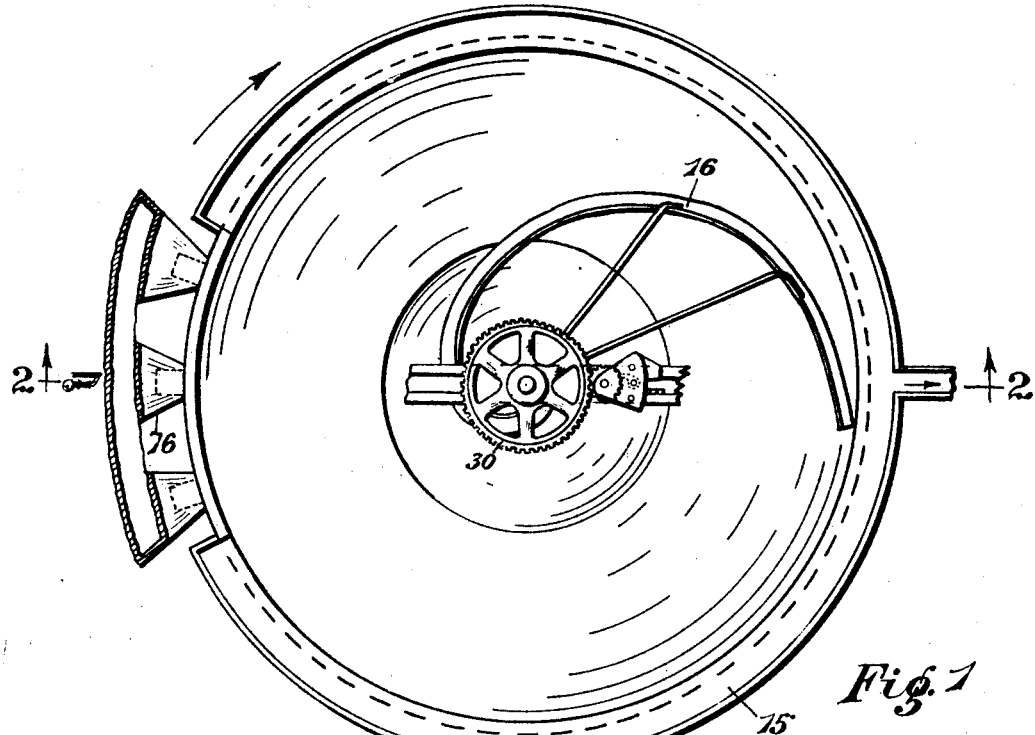
Figure 1 represents a plan view of our thickener and clarifier in its simplest form.
Figure 2:
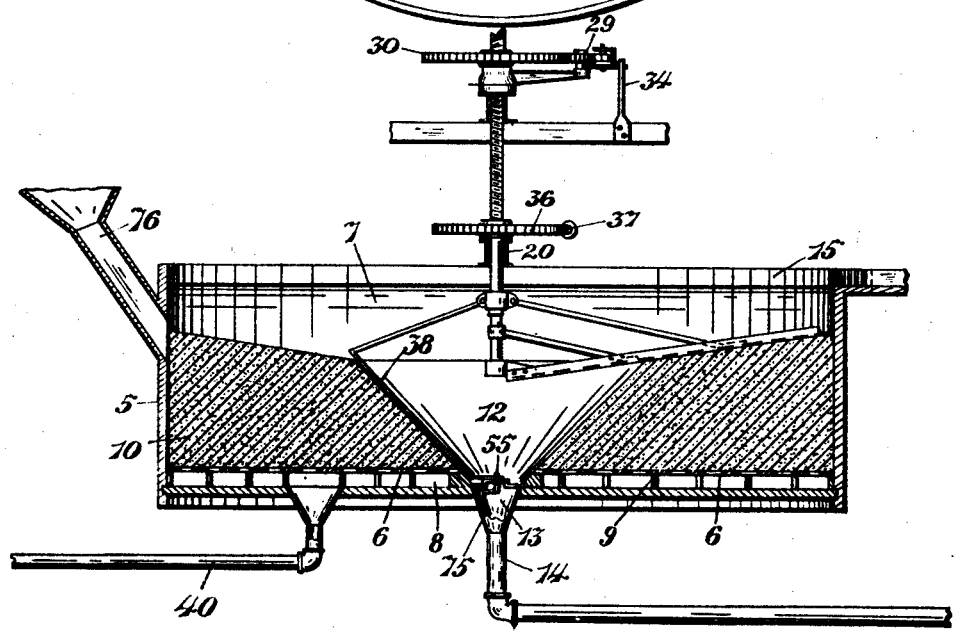
Figure 2, a central vertical section through the apparatus along the line 2—2, Figure 1.

Referring first to Figures 1 and 2 of the drawings which illustrate the apparatus in its simplest form, 5 designates a preferably cylindrical tank which by a perforated partition 6 is divided into upper and lower compartments 7 and 8.

The partition 6 which constitutes the filter bottom of the apparatus may be made of wood, cocoa matting, burlap, coarse rock or other suitable pervious material and it is supported upon sills 9 in spaced relation to the bottom of the tank.

The upper compartment 7 contains a filtering medium 10 composed of sand, charcoal or other permeable material which is supported upon the partition 6 and which has a central well or passage 12 in alined connection with a preferably funnel-shaped duct 13 between central openings in the filter bottom and the bottom of the tank.

The alined passages function in the operation of the machine for the removal of thickened solids subsided upon the filter bed and they connect with a conduit 14 which conducts the thickened matter to a distant point of discharge.

The removal of the matter discharged into the well by the action of a scraping mechanism hereinafter to be described, may be expedited by the use of an exhaust pump connected at the end of the conduit 14. A diaphragm pump is well adapted for the purpose but since the specific construction or arrangement of the pump is not a part of the present invention, the pump has not been shown in the drawings.

The tank has at its upper edge a peripheral overflow launder 15 for the decantation of clear liquid rising above the settling solids, and a feed-chute 76 is disposed to deposit fresh material into the upper compartment of the tank.

The thickened matter settling at the surface of the filter bed is mechanically removed therefrom into the central well 12 which as stated hereinbefore connects by means of the duct 13 with the discharge conduit 14, and the filter bed is maintained in a condition of maximum efficiency by the simultaneous removal of its fouled upper strata.

In order to accomplish this object while the machine is in operation, we provide a scraper element capable of removing the top layer of the filter bed together with the superimposed thickened solids, in connection with an operating mechanism including means for feeding the scraper downwardly at regular intervals in its operative movement.

A mechanism of simple construction, well adapted to produce the above stated results, has been shown in detail in Figures 8 to 11 of the drawings, but it is to be understood that other means may be employed within the spirit of the present invention which relates more particularly to the process of clarification and thickening and to the apparatus which performs the process by an interdependent removal of supernatant and subsurface liquids as stated hereinbefore.

The mechanism above referred to comprises one or more scraper blades 16 preferably curved in the direction of their rotary movement and connected at the lower end of an upright shaft 17.

A torque tube 18 through which the shaft loosely passes, is fitted for rotation in bearings 19 and 20 and a drive-spider 21 keyed to the torque tube at the lower end thereof is operatively connected with the scraper by means of a pivoted drive arm 22.

The connection between the drive-arm and the scraper is established through the medium of a clevis 23 embracing the curved lower extremity of the drive arm, as best shown in Figure 11, and holding it in sliding relation to the scraper whereby to permit of the independent outward movement of the arm to compensate for the varying distance between its point of contact with the scraper and its point of connection with the torque tube while the arm is fed downwardly by longitudinal movement of the shaft. The rigidity of the scraper may be increased by the provision of a brace 24 connecting with a collar 25 on the shaft.

Rotatably supported upon the upper bearing 19 is a feed-arm 26 which is connected for rotation with the shaft by means of a sliding key 27. The arm is formed on a hub 28 which meets the upper end of the torque tube within the bearing and it carries at its outer end a pinion 29 which meshes with a gear wheel 30 rotatably supported upon the hub.

The upper portion of the shaft 17 has a screw thread in operative engagement with a corresponding female thread in the hub of the gear wheel for its longitudinal movement by rotation of the wheel as will hereinafter be more fully described.

The feed arm 26 carries in addition to the pinion, a pawl-carrier 31 which is pivoted to move about the axis of the pinion and which is held yieldingly in its normal position by a spring 32. The normal position of the carrier is adjustable by means of a ratchet return stop 80 shown in Figure 9.

One or more pawls 33 on the carrier engage with the pinion, and one or more stops 34 are fixed on suitable supports in the path of a shoulder 35 on the carrier to effect a pivotal movement of the latter at predetermined intervals in the rotary movement of the arm.

A drive gear 36 is keyed on the torque tube above the bearing 20 upon which it is supported, and a worm 37 meshing with the gear is connected with a conveniently located motor or other source of energy.

It will be apparent that by the above described arrangement, the torque tube is longitudinally immovable while the shaft is free to move axially within the same and that both the shaft and the torque tube are compelled to rotate in unison by the driving action of the gear wheel 36. As the shaft revolves the shoulder 35 of the pawl carrier 31 on the feed arm 26 comes periodically in contact with one or another of the fixed abutments 34 thereby causing the carrier to move about its pivot which by the action of a pawl 33 rotates the pinion 29.

In case two or more pawls are arranged upon the carrier they will engage the gear consecutively and thus coordinate to rotate the pinion through a definitely measured arc during each engagement of the shoulder on the carrier with one of the fixed abutments.

The rotary movement of the pinion is transmitted to the gear-nut 30 which being supported upon the hub of the feed-arm, effects a downward motion of the shaft and the therewith connected scraper.

It will thus be seen that a rotary movement of the driving mechanism imparted thereto through the medium of the gear wheel 36 will move the scraper or scrapers circularly over the surface of the filter bed.

The scraper moves the solids settling on the surface of the filter medium to and into the central well 12 and the downward movement of the scraper periodically effected by the action of the feed-appliance included in the operating mechanism, compels it to simultaneously remove the fouled upper strata of the filter bed and thereby maintains the latter in a condition of maximum efficiency.

The movement of the matter impelled and loosened by the scraper, to the central well of the filter bed, is facilitated by slanting the surface of the bed from the peripheral edge thereof inwardly as shown in the drawings. It is to be understood, however, that conditions may arise which render it expedient to retard the movement of the material by maintaining the surface in a substantially horizontal plane or by slanting it in an opposite direction from the center of the tank.

The wall of the discharge well 12 is preferably made in the shape of an inverted cone or funnel to accelerate the movement of the solids to the discharge opening in the bottom of the tank, and the wall may be protected against caving by lining it with either a downwardly movable shell or with a layer of destructible material which can be removed by the scraper with the upper strata of the filter bed.

In order to prevent the adherence of solid matter to the wall of the well and to constantly keep it in the desired size and form, a scraper 38 slanted to conform with the slope of the well is mounted on the spider 21 which carries the drive arm of the surface scraper 16, and is by means of a pintle 55 rotatably supported upon a step-bearing 39 placed transversely of the opening in the bottom of the tank at the lower end of the well.

Another similar scraper 75 rigidly attached to the pintle 55 extends in the funnel-shaped duct 13 at the lower end of the well for the purpose of preventing accumulation of matter, by its rotary motion along the wall thereof.

In the operation of our invention, the material is fed through the chute 76 into the compartment 7 of the tank above the filter bed where the solid constitutes of the liquid mass subside by gravity and by the force which causes part of the liquid to percolate through the filter bed as will later be explained.

The quantity of material fed into the tank is measured so that its liquid contents are in excess of the percolative capacity of the filter bed and the liquid rising out of the settling solids is gradually clarified in a zone which normally extends above the level of the overflow determined by the peripheral outlet of the tank which connects with the launder 15.

It will thus be evident that in the operation of the machine contingent upon a continuous feed, clear liquid is discharged above and below the filter bed by what may be termed an overflow and an underflow while the solid residue is removed through the central well. The underflow which is effected under natural or mechanically increased or decreased pressures coordinate with the overflow, produces a thickened pulp of greater density than that ordinarily obtained in machines depending on only an overflow for the removal of clarified liquid, and it moreover increases the capacity of the machine without extension of the settling area.

Aside from other points of advantage, the last mentioned feature is economically of considerable importance in that it saves floor space and cost of installation and in that it increases the capacity of the plant without advance in the expenditure of power or expense of operation.

It has moreover been observed that the extraction of clear liquid below the filter bed has a decided advantageous influence upon the rate of settlement above the same.

The percolation of the liquid is controlled by the ratio in pressures above and below the filter bed and is therefore proportionate to the head of liquid in the tank.

It is desirable, however, to at times expedite and accelerate the percolative action by a negative pressure maintained below the filter bed by the exhaust of air from the space between the filter bottom and the bottom of the tank and with this object in view said space may be connected by means of a conduit 40 to a vacuum pump which forcibly draws the liquid through the filter bed and delivers it to a conveniently disposed tank or reservoir.

It will be understood without further illustration that the sills 9 on which the filter bed is supported are either broken or apertured to place the entire space below the bed in communication with the outlet in the bottom of the tank, to which the conduit 40 is connected.

The operation of the machine as hereinabove described is subject to pressure variations owing to the gradual lowering of the filtering bed, changes in the feed and other circumstances, and in order to maintain a substantially uniform separative action, it is desirable that means be provided to control the ratio in pressures above and below the filter bed either automatically or at the will of the operator.

From the many expedients that may be employed to accomplish the above purpose, those hereinafter described have been selected as illustrative of the general principle upon which this feature of our invention is based.

When a suction pump is used in connection with the discharge pipe 40, the ratio of pressures above and below the filter bed is readily regulated by varying the velocity of the pump or by otherwise controlling its effect upon the percolative action, but it has been found more simple under ordinary working conditions to maintain a uniform predetermined pressure ratio by controlling the head of liquid above the filter bed. Thus in Figure 3 has been shown a stand pipe 41 connected at its lower end with an outlet of the space beneath the filter bed.

The stand pipe has a movable upper section 42 connected to its body portion by a flexible joint 43 and suitable means such as a toothed segment 44 and a locking detent 45, are provided to hold the upper section at an adjusted angle relative to the body portion of the pipe.

The percolated liquid rises in the stand pipe and by lowering or elevating the open end of the pipe by adjustment of its upper section, the ratio of pressures above and below the filter bed may be maintained at any predetermined degree. In this connection, it must be understood that the rise of clear liquid in the stand pipe is dependent on the density of the liquid above the filter bed, the resistance offered by the filter bed to the downward movement of the liquid and the height of the overflow level above the surface of the filter bed.

A similar result is automatically obtained by the means illustrated in Figure 12 in which the open end of a rigid stand pipe 46 connected as before, is normally closed by a valve 47 which is counterbalanced by a weight 48 through the medium of a lever 49. When the vacuum below the filtering medium increases beyond a predetermined degree, the valve is opened and air enters to relieve the vacuum until the apparatus is restored to its normal condition.

In the preceding part of the description, the process has been considered as being continuous in that it combines with a substantially uniform feed, a continuous overflow, a continuous discharge of percolated liquid and an uninterrupted removal of settling solids and it is apparent that in order to maintain the working condition of the apparatus in which the process is conducted, it is essential that the filter bed be constantly at or near its normal state of permeability and that its upper portion remain in a condition which permits of the ready removal of its upper strata by the revolving scrapers.

Excessive pressure if continuously maintained above the filter bed will compact the material at the surface thereof to such an extent that its removal by the revolving scrapers becomes practically impossible and it will therefore be evident that the continuous process is restricted to a pressure ratio below that under which the above stated adverse condition is liable to occur, thus limiting the capacity of the machine.

The process may, however, be conducted under a pressure which would be prohibitive in a continuous operation, by reducing or discontinuing the surface pressure at regular intervals and by periodically interrupting the discharge of solids by intermittent operation of the scrapers.

In Figure 6 of the drawings, a valve 50 controls the connections between the space below the filter bed, the stand pipe 46 and the vacuum pump, and a tank 51 is mounted at the upper end of the stand pipe to provide a surplus of liquid which equalizes the pressures above and below the filter bed when the operation is discontinued.

Figure 3:
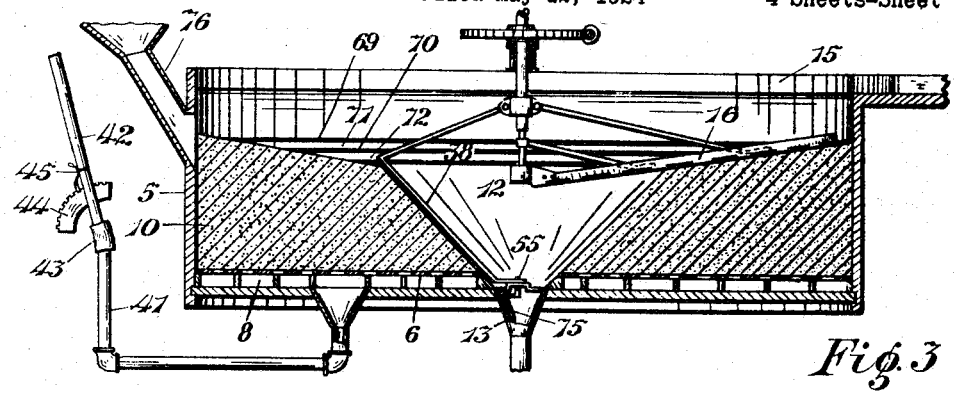
Figure 3 shows a similar section including certain modifications for the regulation of pressures and the decantation by percolation of the clarified supernatant liquid.

An adjustable pipe 52 connected to the stand pipe below the tank, performs the function of the upper section of the pipe shown in Figure 3 as hereinbefore described.

When the connection between the machine and the vacuum pump is cut off by adjustment of the valve 50, the stand pipe 46 is simultaneously placed in communication with the space below the filter bed, and the liquid entering said space from the tank 51 immediately reduces the pressure at the surface of the bed.

By intermittent operation of the valve, the pressure at the surface of the filter bed may thus be alternately increased to the full capacity of the pump or head and decreased to a degree readily regulated by adjustment of the pipe 52 and the process may thus be conducted under pressures prohibitive in a continuous operation without detrimental influence upon the condition of the filter bed or the operation of the scrapers.

In order to provide under the above stated conditions for the removal of the solids by a continuously operating pump and to prevent of overloading the discharge apparatus in case of an intermittent or heavy supply of solids to the well of the filter bed, a sump 53 is formed beneath the discharge opening in the bottom of the tank, in which the solids may collect before passing into the conduit 14 connected with the pump.

A scraper 54 connected to the spindle 55 at the lower end of the well-forming scraper 38, serves to prevent the adhesion of solids to the wall of the sump and to facilitate the removal of accumulating matter by a stirring action.

In Figure 7 of the drawings has been illustrated a system to automatically reverse a valve of the above described character at predetermined intervals and to simultaneously control the removal of solids from the filter bed by periodic discontinuation of the operation of the scraping mechanism.

A clock-actuated time switch 56 controls the circuit of an electro-magnetic device 57 which operates the valve 50, and a magnetic clutch 58 is arranged between the driving pinion 37 and the motor.

The circuit is indicated by conductors 59 connected with a source of electricity 60, and a time-limit switch 61 is connected in multiple with the time-switch to restrain the operation of the scraping mechanism during the intervals in which the subspace of the filter element is in operative connection with the vacuum pump.

It will be understood that the switches cooperate to periodically open and close the circuit and to thereby control the variations in pressure-ratio and the removal of solids as hereinbefore described.

The capacity of the apparatus may furthermore be increased by superposing a series of units one above another in connection with a common operating mechanism for removal of the solids. An arrangement of this character has been illustrated in Figure 4 in which a thickener tray of the type shown in the patent to Blomfield, No. 1,237,745, is placed above a clarifier and thickener constructed in accordance with the present invention.

The two thickeners are mounted in the same tank and the upper thickener comprises a slanting bottom 62 provided with a central opening 63 for the discharge of thickened solids above the well of the lower thickener. Scraper arms 64 impel the settled solids to the discharge opening 63 by connection with the rotating torque tube of the operating mechanism of the scrapers of the lower thickener.

The overflow of clear liquid rising from the solids settling in the two units passes through pipes 78 and 79 to a launder 65.

Figure 5:
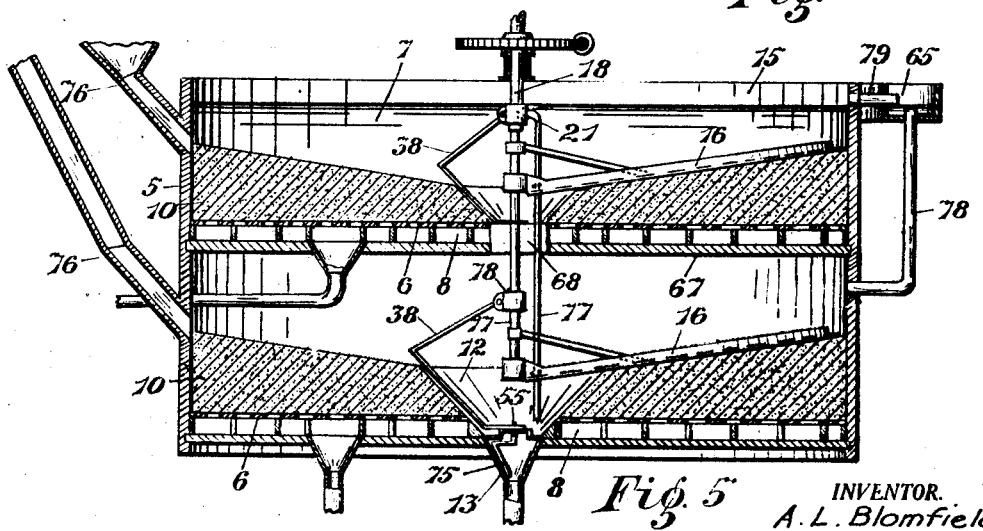
Figure 5 shows the co-operative combination of two units of the type illustrated in Figure 1.

In Figure 5 of the drawings, two units identically alike and each constructed in accordance with our invention, are superposed one above the other. A single tank-construction is adapted to both units by the provision of a partition 67 which constitutes the bottom of the upper unit, the scrapers of the two units are connected with a common operating mechanism and the thickened solids removed from the filter bed of the upper unit are discharged through an opening 68 in the partition, above the well of the lower unit.

In order to effect a downward feed of the scrapers in both units while they rotate in unison about their common axis, the driving mechanism has been slightly modified as shown in the drawing, by the provision of an arm 77 connected to the drive spider 21, which engages with the scraper arm 16 of the lower unit and by attaching the well scraper 38 of the same unit to a loose collar 78 on the shaft 17.

Figure 4:
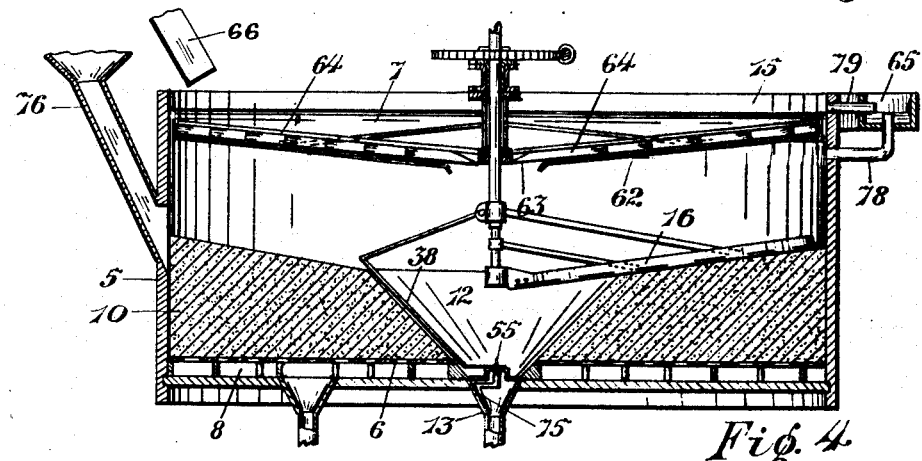
Figure 4 represents in combination with a thickening and clarifying unit of the type shown in Figure 1, a superimposed thickening unit for the preliminary treatment of the material.

It will be readily apparent that an arrangement of the character shown in Figures 4 and 5, greatly increases the capacity of the machine at a comparatively low cost of installation and operation and without occupying more floor space than a single unit, and it will be understood without further illustration that any plurality of units may in this manner be combined to still further increase the settling area and the corresponding capacity of the apparatus.

The overflow at the top of the tank for the decantation of clear liquid rising out of settling solids may be dispensed with by discharging the clear liquid through the filter bed together with the filtrate from the thickened material. This result is accomplished by regulating the feed so that the level of liquid in the tank, indicated by the line 69 in Figure 3, is adjacent the peripheral edge of the filter bed and the divisional plane 70 between the clear zone 71 and the zone 72 of solids in suspension intersects the bed at a distance from said edge. This keeps the marginal portion of the filter bed in the clear settling zone and permits the supernatant clear water to percolate through the bed in a range exterior and distinct of the part of the bed through which passes the liquid of the more settled material.

What we claim and desire to secure by Letters Patent is:

1. A clarifying and thickening process which consists in passing a mixture of liquid and solids upon a column of filtering material, maintaining a liquid head above the filtering material, removing successive layers of the column of filtering material together with deposits contained thereon, withdrawing filtrate from the bottom of the column of filtering material, feeding the mixture upon the column a substantial distance below the top of the liquid head in excess of the amount required to maintain the liquid head and withdrawing the excess liquid from the top of the liquid head.

2. Process according to claim 1, wherein the mixture is fed upon the column of filtering material close to the surface thereof.

3. Process according to claim 1, including the step of regulating the effective pressure of the liquid column to maintain a substantially uniform rate of percolation through the filtering material.

In testimony whereof we have affixed our signatures.

ALFRED L. BLOMFIELD.
LOYAL S. HARNER.
HARRISON S. COE.